US012115795B2

(12) United States Patent
Takei et al.

(10) Patent No.: US 12,115,795 B2
(45) Date of Patent: Oct. 15, 2024

(54) LIQUID SUPPLY APPARATUS, LIQUID STORAGE TANK, AND LIQUID EJECTING APPARATUS

(71) Applicant: CANON KABUSHIKI KAISHA, Tokyo (JP)

(72) Inventors: Yasunori Takei, Tokyo (JP); Hiroki Hayashi, Kanagawa (JP); Hiroshi Koshikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/944,931

(22) Filed: Sep. 14, 2022

(65) Prior Publication Data

US 2023/0001701 A1 Jan. 5, 2023

Related U.S. Application Data

(62) Division of application No. 17/208,763, filed on Mar. 22, 2021, now Pat. No. 11,472,191.

(30) Foreign Application Priority Data

Mar. 24, 2020 (JP) ................................ 2020-052597

(51) Int. Cl.
*B41J 2/175* (2006.01)

(52) U.S. Cl.
CPC ....... *B41J 2/17523* (2013.01); *B41J 2/17506* (2013.01); *B41J 2/17556* (2013.01); *B41J 2/17596* (2013.01)

(58) Field of Classification Search
CPC .... B41J 2/175; B41J 2/17503; B41J 2/17506; B41J 2/17509; B41J 2/17513; B41J 2/1752; B41J 2/17523; B41J 2/17596
See application file for complete search history.

(56) References Cited

U.S. PATENT DOCUMENTS 6,022,102 A * 2/2000 Ikkatai .................. B41J 2/2056 347/85
6,234,615 B1 * 5/2001 Tsukuda .............. B41J 2/17509 347/85

(Continued)

FOREIGN PATENT DOCUMENTS

CN 1535834 10/2004
CN 1694813 11/2005

(Continued)

OTHER PUBLICATIONS

Office Action dated Nov. 8, 2022 in counterpart Chinese Application No. 202110299766.4, together with English translation thereof.

(Continued)

*Primary Examiner* — Anh T Vo
(74) *Attorney, Agent, or Firm* — Venable LLP

(57) ABSTRACT

A liquid supply apparatus includes a liquid storage tank in communication with a liquid ejecting head that ejects liquid and a cartridge configured to be detachably provided to the liquid storage tank. The liquid storage tank includes an atmosphere communication portion in communication with the atmosphere and a first connecting portion that, in a state where the cartridge is attached to the liquid storage tank, enables the cartridge to be in liquid communication with the liquid storage tank. The liquid storage tank also includes a second connecting portion that, in the state where the cartridge is attached to the liquid storage tank, is connected to the cartridge so as to be liquid-tight with the cartridge and enables the cartridge to be in gaseous communication with the atmosphere communication portion.

16 Claims, 12 Drawing Sheets

(56) References Cited

U.S. PATENT DOCUMENTS

| | | | | |
|---|---|---|---|---|
| 6,270,206 | B1 | 8/2001 | Shimizu et al. | 347/86 |
| 6,276,784 | B1 | 8/2001 | Ikkatai et al. | B41J 2/165 |
| 6,293,663 | B1 | 9/2001 | Koshikawa et al. | 347/86 |
| 6,325,500 | B1 | 12/2001 | Kitabatake et al. | 347/86 |
| 6,347,865 | B1 | 2/2002 | Matsumoto et al. | 347/86 |
| 6,350,025 | B1 | 2/2002 | Morita et al. | 347/86 |
| 6,382,783 | B1 | 5/2002 | Hayashi et al. | 347/85 |
| 6,390,601 | B1 | 5/2002 | Morita et al. | 347/49 |
| 6,402,298 | B1 | 6/2002 | Nanjo et al. | 347/49 |
| 6,402,308 | B1 | 6/2002 | Hattori et al. | 347/86 |
| 6,422,674 | B1 | 7/2002 | Hinami et al. | 347/7 |
| 6,443,567 | B1 | 9/2002 | Hayashi et al. | 347/85 |
| 6,447,084 | B1 | 9/2002 | Uetsuki et al. | 347/7 |
| 6,450,631 | B1 | 9/2002 | Hayashi et al. | 347/86 |
| 6,454,400 | B1 | 9/2002 | Morita et al. | 347/86 |
| 6,471,343 | B1 | 10/2002 | Shimizu et al. | 347/85 |
| 6,474,797 | B2 | 11/2002 | Kurata et al. | 347/85 |
| 6,485,136 | B1 | 11/2002 | Shimizu et al. | 347/86 |
| 6,505,923 | B1 | 1/2003 | Yamamoto et al. | B41J 2/175 |
| 6,511,167 | B1 | 1/2003 | Kitabatake et al. | 347/86 |
| 6,530,654 | B2 | 3/2003 | Kitabatake et al. | 347/86 |
| 6,540,321 | B1 | 4/2003 | Hirano et al. | 347/22 |
| 6,540,342 | B2 | 4/2003 | Koshikawa et al. | 347/86 |
| 6,543,886 | B1 | 4/2003 | Hattori et al. | 347/85 |
| 6,550,898 | B2 | 4/2003 | Hayashi et al. | 347/85 |
| 6,598,963 | B1 | 7/2003 | Yamamoto et al. | 347/85 |
| 6,629,758 | B2 | 10/2003 | Okamoto et al. | 347/85 |
| 6,637,872 | B2 | 10/2003 | Ara et al. | 347/85 |
| 6,655,542 | B2 | 12/2003 | Koshikawa et al. | 220/661 |
| 6,692,115 | B2 | 2/2004 | Sanada et al. | 347/85 |
| 6,698,871 | B1 | 3/2004 | Hayashi et al. | 347/86 |
| 6,702,427 | B2 | 3/2004 | Shimizu et al. | 347/50 |
| 6,705,715 | B2 | 3/2004 | Morita et al. | 347/87 |
| 6,709,092 | B2 | 3/2004 | Hayashi et al. | 347/86 |
| 6,712,458 | B2 | 3/2004 | Hatasa et al. | 347/86 |
| 6,719,415 | B1 | 4/2004 | Hattori et al. | 347/86 |
| 6,742,857 | B2 | 6/2004 | Koshikawa et al. | 347/19 |
| 6,746,110 | B2 | 6/2004 | Hayashi | 347/86 |
| 6,755,500 | B2 | 6/2004 | Hirano et al. | 347/22 |
| 6,796,645 | B2 | 9/2004 | Hayashi et al. | 347/86 |
| 6,805,434 | B2 | 10/2004 | Hayashi et al. | 347/85 |
| 6,815,381 | B1 | 11/2004 | Yamamoto et al. | 442/187 |
| 6,824,258 | B2 | 11/2004 | Yamamoto et al. | 347/86 |
| 6,827,431 | B2 | 12/2004 | Kitabatake et al. | 347/86 |
| 6,851,798 | B2 | 2/2005 | Koshikawa et al. | 347/85 |
| 6,863,762 | B2 | 3/2005 | Sanada et al. | 156/180 |
| 6,877,847 | B2 | 4/2005 | Hayashi et al. | 347/86 |
| 6,877,848 | B2 | 4/2005 | Shimizu et al. | 347/86 |
| 6,921,161 | B2 | 7/2005 | Morita et al. | 347/86 |
| 6,942,326 | B2 | 9/2005 | Hayashi et al. | 347/86 |
| 6,966,631 | B2 | 11/2005 | Matsuo et al. | 347/49 |
| 6,969,161 | B2 | 11/2005 | Kuwabara et al. | 347/85 |
| 6,997,548 | B2 | 2/2006 | Matsuo et al. | 347/86 |
| 7,118,194 | B2 | 10/2006 | Matsuo et al. | 347/49 |
| 7,134,747 | B2 | 11/2006 | Hayashi et al. | 347/86 |
| 7,165,829 | B2 | 1/2007 | Hayashi et al. | 347/49 |
| 7,293,865 | B2 | 11/2007 | Tsukuda et al. | 347/86 |
| 8,011,768 | B2 | 9/2011 | Hayashi et al. | 347/86 |
| 8,439,491 | B2 | 5/2013 | Hayashi et al. | 347/86 |
| 8,485,642 | B2 | 7/2013 | Hayashi et al. | 347/49 |
| 8,529,037 | B2 | 9/2013 | Miyashita et al. | 347/86 |
| 8,960,869 | B2 | 2/2015 | Takada et al. | 347/86 |
| 9,333,758 | B2 | 5/2016 | Koshikawa et al. | B41J 2/1752 |
| 9,597,884 | B2 | 3/2017 | Nanjo et al. | B41J 2/17526 |
| 9,669,631 | B2 * | 6/2017 | Takahashi | B41J 2/21 |
| 9,724,929 | B2 | 8/2017 | Yoshii et al. | B41J 2/1752 |
| 9,821,562 | B2 | 11/2017 | Nanjo et al. | B41J 2/17523 |
| 9,840,082 | B2 | 12/2017 | Nanjo et al. | B41J 2/17513 |
| 9,878,551 | B2 * | 1/2018 | Shimizu | B41J 2/17553 |
| 9,908,338 | B2 | 3/2018 | Koshikawa et al. | B41J 2/17559 |
| 9,919,536 | B2 | 3/2018 | Miyashita et al. | B41J 2/17523 |
| 10,029,474 | B2 | 7/2018 | Takada et al. | B01D 19/0073 |
| 10,160,222 | B2 | 12/2018 | Shiba et al. | B41J 2/17566 |
| 10,207,511 | B2 | 2/2019 | Nanjo et al. | B41J 2/175 |
| 10,336,087 | B2 | 7/2019 | Miyashita et al. | B41J 2/17509 |
| 10,391,776 | B2 | 8/2019 | Hayashi et al. | B41J 2/17513 |
| 10,618,293 | B2 | 4/2020 | Koshikawa et al. | G03G 15/0886 |
| 10,675,882 | B2 | 6/2020 | Shiba et al. | B41J 2/17566 |
| 10,836,175 | B2 | 11/2020 | Miyashita et al. | B41J 2/17553 |
| 10,994,548 | B2 | 5/2021 | Iinuma et al. | B41J 2/175 |
| 11,072,182 | B2 | 7/2021 | Hayashi et al. | B41J 2/175 |
| 11,084,294 | B2 * | 8/2021 | Osakabe | B41J 2/17566 |
| 11,192,381 | B2 * | 12/2021 | Tajima | B41J 2/17596 |
| 11,198,304 | B2 | 12/2021 | Morikawa et al. | B41J 2/175 |
| 2003/0038867 | A1 | 2/2003 | Yamamoto et al. | 347/86 |
| 2004/0196341 | A1 | 10/2004 | Ogura et al. | B41J 2/175 |
| 2006/0017787 | A1 | 1/2006 | Inoue et al. | B41J 2/175 |
| 2014/0292957 | A1 | 10/2014 | Okazaki | B41J 2/175 |
| 2016/0039213 | A1 | 2/2016 | Tomoguchi et al. | B41J 2/175 |
| 2016/0297205 | A1 | 10/2016 | Takahashi | B41J 2/175 |
| 2017/0246878 | A1 | 8/2017 | Kudo et al. | B41J 2/19 |
| 2019/0030910 | A1 | 1/2019 | Tanabe et al. | B41J 2/17566 |
| 2021/0300055 | A1 | 9/2021 | Koshikawa et al. | B41J 2/17566 |
| 2021/0362506 | A1 | 11/2021 | Kishikawa et al. | B41J 2/17553 |

FOREIGN PATENT DOCUMENTS

| | | |
|---|---|---|
| CN | 104070819 | 10/2014 |
| CN | 204196454 U | 3/2015 |
| CN | 105984228 | 10/2016 |
| CN | 107128075 | 9/2017 |
| JP | H08-034122 | 2/1996 |
| JP | H10-29318 | 2/1998 |
| JP | 2001-001539 | 1/2001 |
| JP | 2014-151512 | 8/2014 |
| JP | 2018-140607 | 9/2018 |
| JP | 2019-025818 | 2/2019 |
| JP | 2020-183118 | 11/2020 |
| WO | 2015/016119 | 1/2015 |

OTHER PUBLICATIONS

Office Action dated Dec. 12, 2023 in counterpart Japanese Application No. 2020-052597, together with English translation thereof.

Office Action dated Feb. 6, 2024 in counterpart Japanese Application No. 2020-052597, together with English translation thereof.

* cited by examiner

LIQUID SUPPLY APPARATUS, LIQUID STORAGE TANK, AND LIQUID EJECTING APPARATUS

This application is a divisional of application Ser. No. 17/208,763 filed Mar. 22, 2021, currently pending; and claims priority under 35 U.S.C. § 119 to Japan Application JP 2020-052597 filed in Japan on Mar. 24, 2021; and the contents of all of which are incorporated herein by reference as if set forth in full.

BACKGROUND OF THE INVENTION

Field of the Invention

The present disclosure relates to a liquid supply apparatus that supplies liquid to a liquid ejecting head, a liquid storage tank used in the liquid supply apparatus, and a liquid ejecting apparatus including those components.

Description of the Related Art

As a liquid ejecting apparatus including a liquid ejecting head that ejects liquid, there is known one that includes a liquid supply apparatus in which a cartridge storing liquid is connected to a tank in communication with the liquid ejecting head, and the cartridge supplies the liquid to the tank.

Examples of liquid ejecting apparatuses including such a liquid supply apparatus include an inkjet printing apparatus that performs printing by ejecting liquid (ink), disclosed in Japanese Patent Laid-Open No. 2019-25818. The inkjet printing apparatus disclosed in this document has a configuration in which in use, a liquid storage chamber (ink storage chamber) of the tank and a liquid storage chamber (ink storage chamber) of the cartridge are separately open to the atmosphere.

SUMMARY OF THE INVENTION

The present disclosure relates to a liquid supply apparatus including: a liquid storage tank in communication with a liquid ejecting head that ejects liquid; and a cartridge that stores the liquid and is detachably provided to the liquid storage tank, in which the liquid storage tank includes an atmosphere communication portion in communication with the atmosphere, a first connecting portion that, in a state where the cartridge is attached to the liquid storage tank, enables the cartridge to be in liquid communication with the liquid storage tank, and a second connecting portion that, in the state where the cartridge is attached to the liquid storage tank, is connected to the cartridge so as to be liquid-tight with the cartridge and enables the cartridge to be in gaseous communication with the atmosphere communication portion.

Further features of the present invention will become apparent from the following description of exemplary embodiments with reference to the attached drawings.

DESCRIPTION OF THE EMBODIMENTS

Figure 1A:
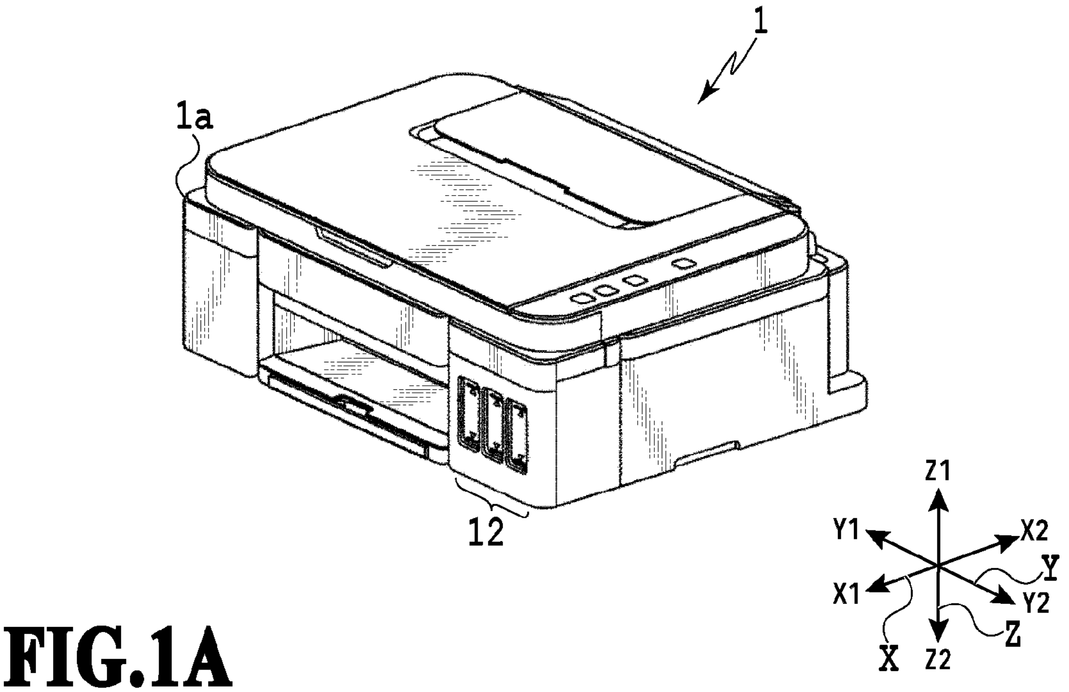
FIG. 1A is an external perspective view of a printing apparatus that is applied to the embodiments.

The configuration disclosed in Japanese Patent Laid-Open No. 2019-25818 has an issue that both the tank and the cartridge require atmosphere communication mechanisms, leading to a larger apparatus size and a higher apparatus cost. In particular, the cartridge needs to be sealed before use such as during transportation, but in use, the cartridge needs to be in communication with the atmosphere while preventing liquid leakage. Thus, the cartridge disclosed in Japanese Patent Laid-Open No. 2019-25818 includes a complicated atmosphere communication mechanism.

Hence, the present disclosure provides a technique that enables the cartridge and the sub-the tank to be in communication with the atmosphere with a simple configuration.

Embodiments of the present invention will be described in detail with reference to the drawings. In the drawings referred to in this specification, X and Y represent two directions orthogonal to each other in a horizontal plane, and Z represents the vertical direction. X1 represents the front direction, X2 the rear direction, Y1 the left direction, Y2 the right direction, Z1 the upward direction, and Z2 the downward direction. In the following description, the upward direction, the downward direction, and the right and left directions are based on the posture of a liquid ejecting apparatus being used in an ordinary manner, unless otherwise noted.

First Embodiment

Figure 1B:
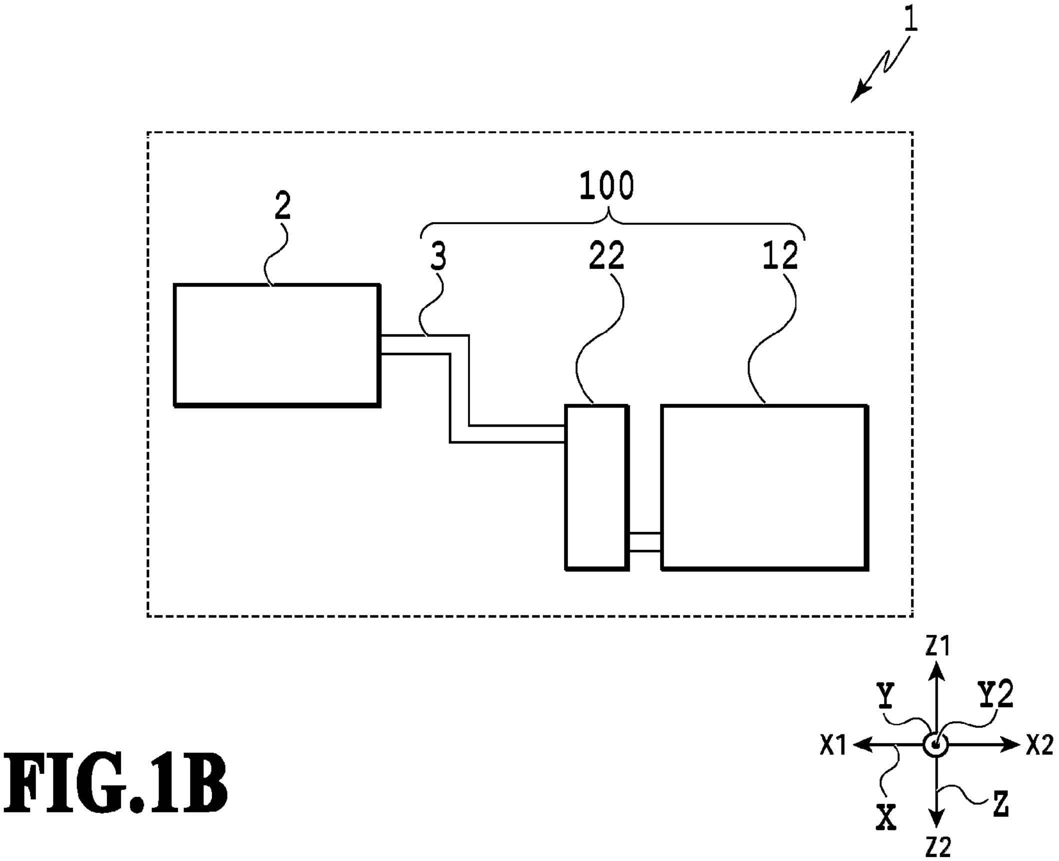
FIG. 1B is a schematic diagram illustrating a printing apparatus that is applied to the embodiments.

First, a description will be given of a first embodiment of the present invention with reference to FIGS. 1A to 4C. FIGS. 1A and 1B are diagrams illustrating a liquid ejecting apparatus 1 in the present embodiment. FIG. 1A is an external perspective view, and FIG. 1B is a schematic diagram illustrating a liquid supply route. The liquid ejecting apparatus 1 described in the present embodiment is an inkjet printing apparatus that performs printing by ejecting liquid such as ink through a plurality of ejection ports provided in a liquid ejecting head 2. Hereinafter, the liquid ejecting apparatus 1 is referred to as the printing apparatus 1, and the liquid ejecting head 2 is referred to as the print head 2.

The printing apparatus 1 illustrated in FIG. 1A is a serial inkjet printing apparatus that performs printing by performing main scanning that moves the print head 2 along a main scanning direction (Y direction) and sub-scanning that conveys the print medium intermittently in a direction (X direction) intersecting the main scanning direction.

The printing apparatus 1 has a housing la serving as the outer shell of the printing apparatus 1. The housing la houses in its inside a not-illustrated scanning mechanism that makes the print head 2 perform main scanning, a not-illustrated conveying mechanism that conveys the print medium on which printing is performed by the print head 2, a liquid supply apparatus 100 that supplies liquid to the print head 2, and a not-illustrated controller that controls those units. The printing apparatus 1 of the present embodiment includes a suction-based recovery mechanism that applies a negative pressure to the ejection ports provided in the print head 2 to discharge ink inside the ejection ports and thus recover the ejection performance of the ejection ports.

The liquid supply apparatus 100, as illustrated in FIG. 1B, includes a sub-tank (liquid storage tank) 22 held in the main body of the printing apparatus 1, a tube 3 connecting the sub-tank 22 and the print head 2 to each other, and a cartridge 12. The cartridge 12 stores liquid (ink) ejected from the print head 2. The cartridge 12 has a configuration described later that enables the cartridge 12 to be detachably provided to the sub-tank 22. In the state where the cartridge 12 is attached and connected to the sub-tank 22, liquid stored in the cartridge 12 is supplied to the sub-tank 22 and temporarily stored there. After that, the foregoing suction-based recovery mechanism applies a negative pressure to the ejection ports of the print head 2, and liquid store in the sub-tank 22 is supplied to the print head 2 via the tube 3. In this way, a liquid supply route is formed from the cartridge 12 to the print head 2, making the print head 2 ready to eject liquid.

Next, the configurations of the cartridge 12 and the sub-tank 22 will be described in detail.

<Cartridge>

Figure 2A:
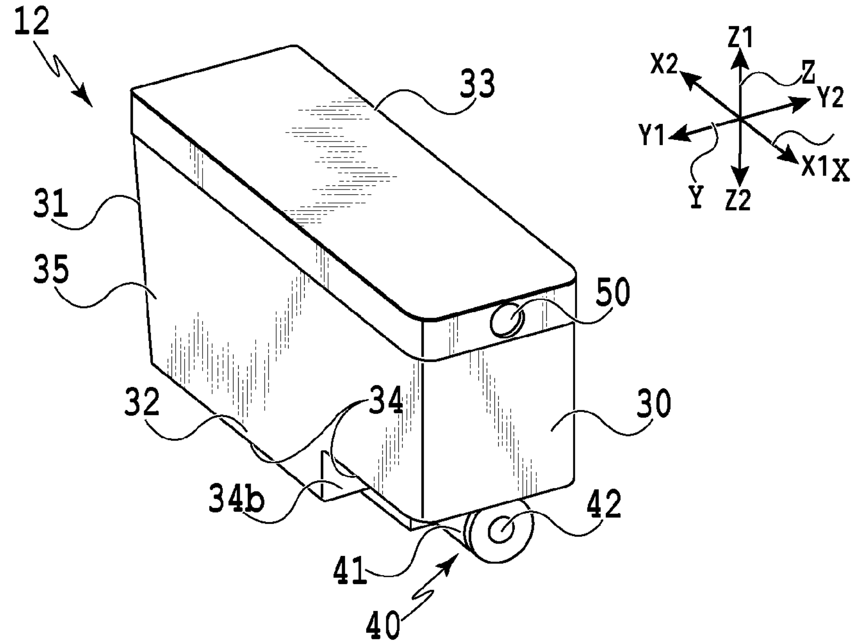
FIG. 2A is an external perspective view of a cartridge in a first embodiment.
Figure 2B:
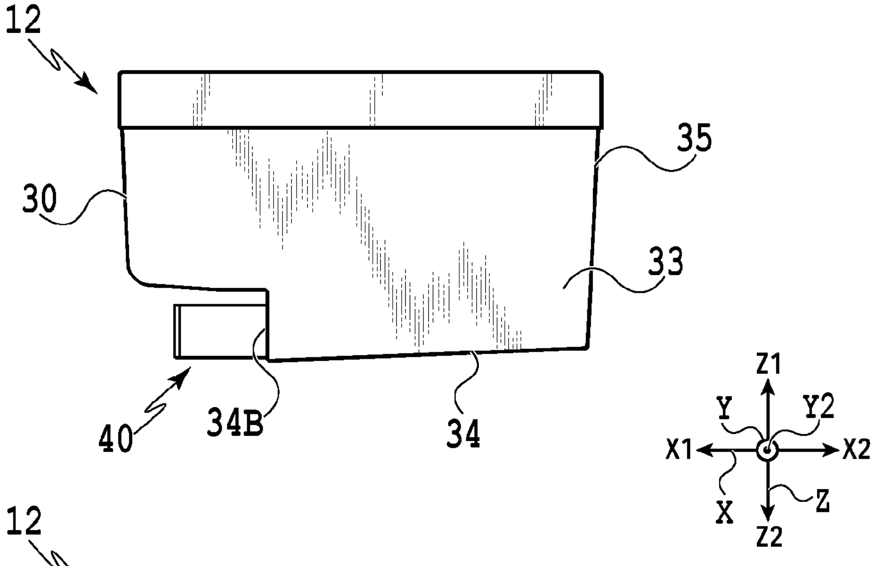
FIG. 2B is a side view of the cartridge in the first embodiment.
Figure 2C:
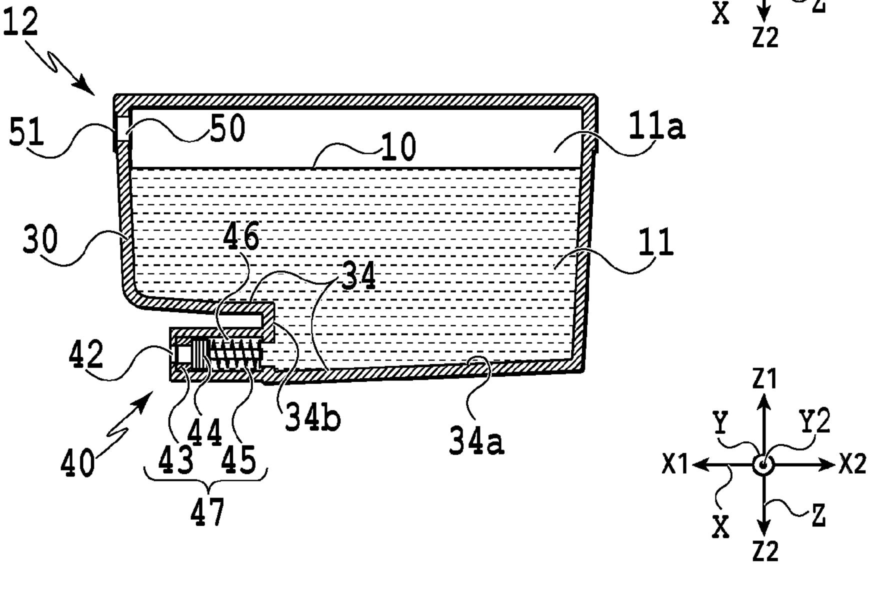
FIG. 2C is a cross-sectional schematic side view of the cartridge in the first embodiment.

FIGS. 2A to 2C are diagrams illustrating the cartridge 12 in the present embodiment. FIG. 2A is a perspective view of the cartridge 12, FIG. 2B is a side view of the cartridge 12, and FIG. 2C is a cross-sectional schematic side view of the internal structure of the cartridge. The cartridge 12 has a hollow box-shaped housing 35 having an approximately rectangular parallelepiped shape. The housing 35 has a front wall portion 30, a rear wall portion 31, right and left wall portions 32 and 33, and a bottom wall portion 34. The housing 35 has in its inside a first storage chamber 11 that stores liquid (ink).

A part of the bottom wall portion 34 is an inclined surface 34*a* inclined from the rear end toward the front end in the posture of the cartridge 12 in use. This inclined surface 34*a* leads the ink in the cartridge 12 along the inclined surface 34*a* smoothly to a liquid supply portion 40 described later.

The first storage chamber 11 has a step portion 34*b* at the bottom wall portion 34. The step portion 34*b* has the liquid supply portion 40 having a cylindrical shape and protruding forward. The liquid supply portion 40 has at its distal end a liquid supply port 42 into which an introduction pipe 20 provided to the sub-tank 22 described later is inserted. The liquid supply portion 40 has in its inside a valve chamber 46 that houses a first valve mechanism 47 to prevent the liquid that has flowed into the liquid supply portion 40 from leaking from the liquid supply port 42.

FIG. 2C illustrates an unused cartridge 12 in the posture in normal use with liquid stored in it. As illustrated in FIG. 2C, there is a space (air buffer chamber) 11*a* over the portion of the first storage chamber 11 where the liquid is stored. In this state, a first atmosphere communication portion (gas communication portion) 50 formed in the front wall portion 30 of the cartridge 12 is positioned higher than the liquid surface 10 and in communication with the air buffer chamber 11*a*.

Figure 3A:
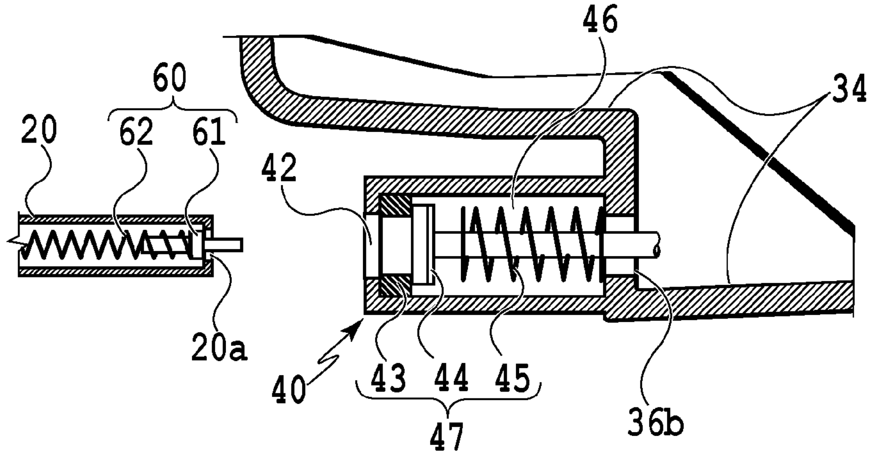
FIGS. 3A and 3B are enlarged cross-sectional side views of a valve mechanism of the cartridge.
Figure 3B:
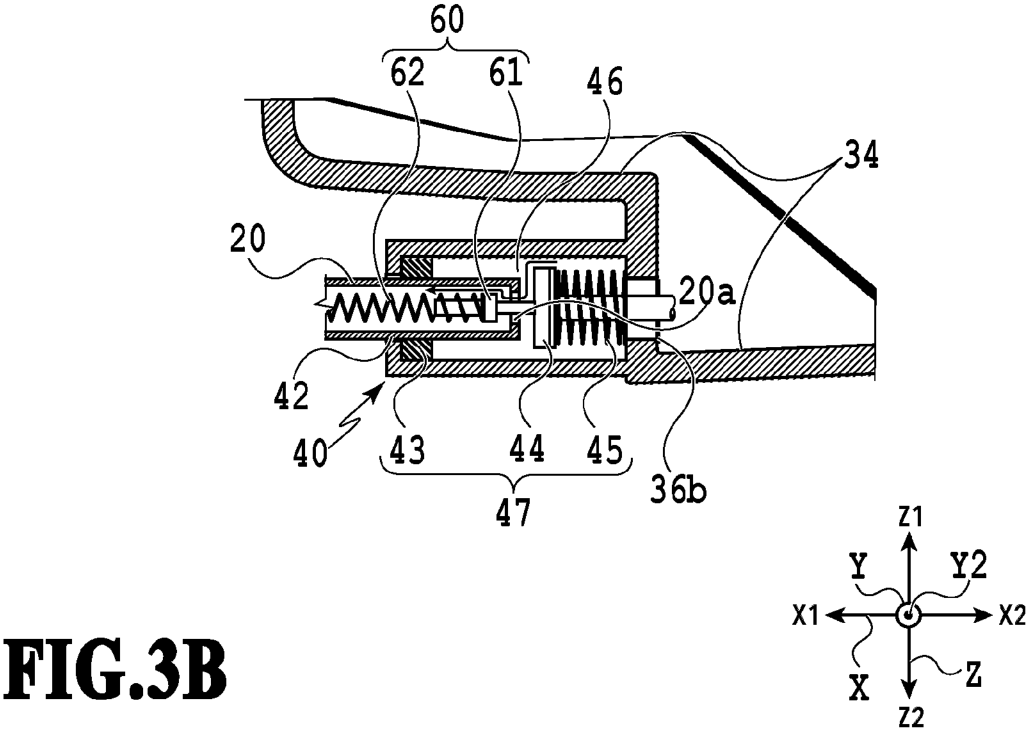

FIGS. 3A and 3B are enlarged diagrams illustrating the configuration of the first valve mechanism 47. FIG. 3A illustrates the first valve mechanism 47 in a state where the cartridge 12 is not attached to the sub-tank 22, and FIG. 3B illustrates the first valve mechanism 47 in a state where the cartridge 12 is attached to the sub-tank 22. The first valve mechanism 47 includes a valve 44 provided to be capable of moving forward and backward relative to the liquid supply port 42, a coil spring 45 that urges the valve 44 toward the liquid supply port 42, and an annular seal member 43 provided around the liquid supply port 42.

In the state illustrated in FIG. 3A, the valve 44 is in close contact with the seal member 43 by the urging force of the coil spring 45, and thus the liquid supply port 42 is closed by the valve 44. Thus, in this state, the liquid inside the valve chamber 46 will never be leaked from the liquid supply port 42. In addition, the introduction pipe 20 provided to the sub-tank 22 described later also has a third valve mechanism 60. The third valve mechanism 60 includes a valve 61 and a coil spring 62 that urges the valve 61 toward a liquid introduction port 20*a* formed at the end of the introduction pipe 20. In the state illustrated in FIG. 3A, the valve 61 closes the liquid introduction port 20*a* by the urging force of the coil spring 62. In this state, one end of the valve 61 (the rear end in FIGS. 3A and 3B) protrudes backward (in the X2 direction) from the liquid introduction port 20*a* of the introduction pipe 20.

In the case where the cartridge 12 is attached to the sub-tank 22, the introduction pipe 20 of the sub-tank 22 described later is inserted through the liquid supply port 42 into the liquid supply portion 40 of the cartridge 12. Eventually, the valve 61 of the third valve mechanism 60 opens the liquid introduction port 20*a,* and the valve 44 of the first valve mechanism 47 opens the liquid supply port 42, as illustrated in FIG. 3B. In this state, the cartridge 12 and the sub-tank 22 are in liquid communication with each other. During the above process, the valve 61 of the third valve mechanism 60 and the valve 44 of the first valve mechanism 47 move as described below.

In the case where the introduction pipe 20 is inserted into the liquid supply portion 40 through the liquid supply port 42, the rear end of the valve 61 of the third valve mechanism 60 comes into contact with the valve 44. At an initial time when the valve 61 comes into contact with the valve 44, the urging force of the coil spring 62 is smaller than the urging force of the coil spring 45. Thus, as the introduction pipe 20 is inserted further into the liquid supply portion 40, the valve 61 is pushed by the valve 44, moving relatively inward within the introduction pipe 20 and thereby opens the liquid introduction port 20*a*. After that, when the introduction pipe 20 is inserted further into the liquid supply portion 40, the urging force of the compressed coil spring 62 exceeds the urging force of the coil spring 45, and the valve 44 is pushed by the valve 61 and moves backward (in the X2 direction). Thus, the valve 44 separates from the seal member 43, and the liquid supply port 42 opens.

As described above, the liquid introduction port 20*a* and the liquid supply port 42 open, which makes the cartridge 12 and the sub-tank 22 in liquid communication with each other. Thus, the liquid that has flowed into the valve chamber 46 from the first storage chamber 11 passes through the introduction pipe 20 and flows into the sub-tank 22 as indicated by an arrow in FIG. 3B.

In the case where the cartridge 12 is removed from the sub-tank 22, and the introduction pipe 20 is pulled out of the liquid supply portion of the cartridge 12, each of the valve 44 and the valve 61 returns to the state illustrated in FIG. 3A. Specifically, the valve 44 closes the liquid supply port 42 by the urging force of the coil spring 45, and the valve 61 closes the liquid introduction port 20*a* by the urging force of the coil spring 62. The above configuration prevents liquid leakage from the liquid introduction port 20*a* of the sub-tank 22 and liquid leakage from the liquid supply port 42 of the cartridge 12.

Meanwhile, the cartridge 12 has at its upper portion the first atmosphere communication portion 50 passing through the front wall portion 30 (see FIGS. 2A and 2C). Before the cartridge 12 is used, the first atmosphere communication portion 50 is sealed with a film (sealing member) 51 sticked on the front wall portion 30 of the cartridge 12.

As described above, for an unused cartridge 12, the inside of the cartridge 12 is sealed with the film 51 and the valve 44. With this configuration, no matter what posture the cartridge 12 takes, for example, during transportation or other occasions, the internal liquid will never leak out. Note that the cartridge 12 illustrated in FIGS. 2A to 2C is prepared for each ink color used in print operation. Each cartridge has the same configuration except that the kind of contained ink is different.

<Sub-Tank>

Figure 4A:
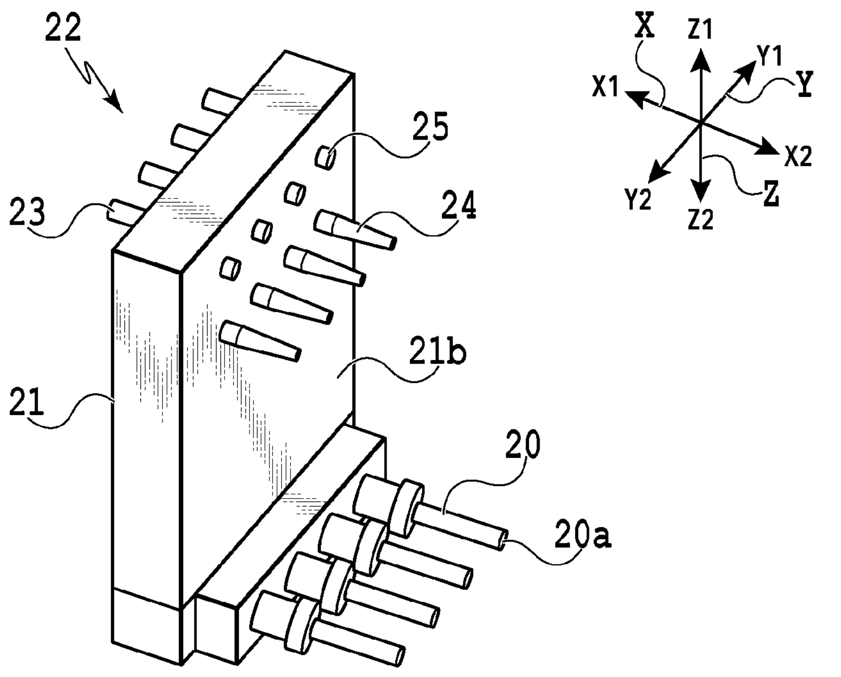
FIG. 4A is an external perspective view of a sub-tank in the first embodiment.
Figure 4C:
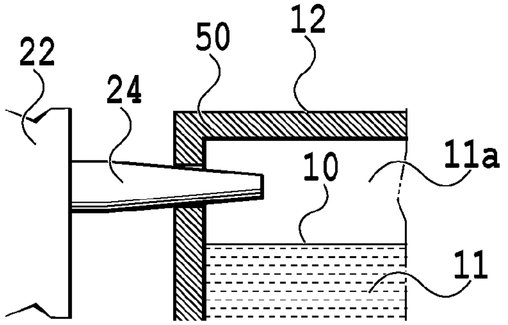
FIG. 4C is a partial enlarged view of the sub-tank in the first embodiment.
Figure 4B:
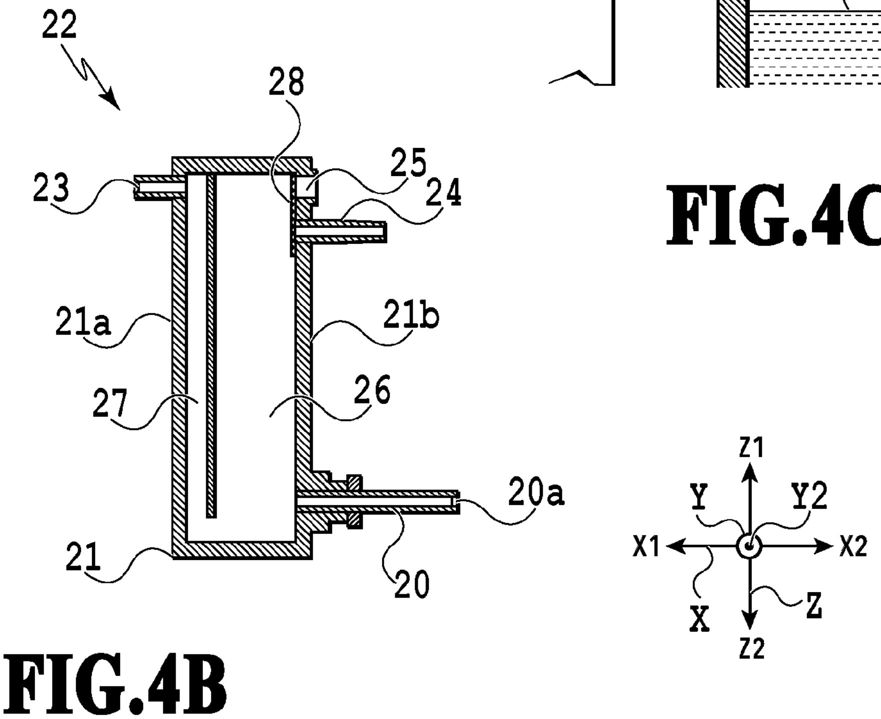
FIG. 4B is a cross-sectional schematic side view of the sub-tank in the first embodiment.

FIGS. 4A to 4C are diagrams illustrating the sub-tank 22 in the present embodiment. FIG. 4A is a perspective view, and FIG. 4B is a cross-sectional schematic side view. FIG. 4C is a partial enlarged view of a needle 24 of the sub-tank 22 and the first atmosphere communication portion 50 of the cartridge 12 illustrating the relationship between them. In FIGS. 4A and 4B, illustration of the third valve mechanism 60 provided in the introduction pipe 20 is omitted, but it is based on the assumption that actually the third valve mechanism 60 is provided as illustrated in FIGS. 3A and 3B. Also, in the drawings referred to in second to fourth embodiments which will be described later, illustration of the third valve mechanism 60 provided in the introduction pipe 20 is omitted.

The sub-tank 22 of the present embodiment has a housing 21 having an approximately rectangular parallelepiped shape. The housing 21 has in its inside a plurality of second storage chambers 26 defined to store different kinds of liquid (for example, inks having different colors). The outer wall of the housing 21 has second atmosphere communication portions 25, first connecting portions 20, second connecting portions 24, and liquid outlets 23 associated with the respective second storage chambers 26.

Specifically, a rear wall portion 21*b* of the housing 21 has the second atmosphere communication portions 25 at its upper portions. The purposes of the second atmosphere communication portions are to make the second storage chambers 26 in communication with the atmosphere. The rear wall portion 21*b* of the housing 21 also has the first connecting portions 20 and second connecting portions 24 that enable the cartridges 12 to be connected.

Each first connecting portion 20 has the introduction pipe 20 protruding backward from a lower portion of the rear wall of the housing 21. The front end of the introduction pipe 20 is open and in communication with the corresponding second storage chamber 26. The introduction pipe 20 has the liquid introduction port 20*a* at its rear end. Note that the introduction pipe 20, as described earlier, has the third valve mechanism 60 (see FIGS. 3A and 3B) to prevent liquid leakage from the liquid introduction port 20*a*.

Each second connecting portion 24 has a hollow needle 24 protruding backward from the rear wall portion 21*b* of the housing 21. The front and rear ends of the needle 24 are open. The opening of the front end of the needle 24 and the opening of the front end of the second atmosphere communication portion 25 are covered with a semipermeable membrane 28 sticked to the inner surface of the second storage chamber 26. The semipermeable membrane 28 is a membrane of a gas-liquid separation member that blocks liquid from passing through but allows gas to pass through. This semipermeable membrane 28 blocks liquid communication of the second atmosphere communication portion 25 and needle 24 to the second storage chamber 26 but allows gaseous communication between them.

As illustrated in FIG. 4C, the needle 24 is formed such that the needle 24 has a tapered shape the outer diameter of which gradually decreases toward the rear end, that the outer diameter of the rear end is smaller than the inner diameter the first atmosphere communication portion 50 of the cartridge, and that the outer diameter at a middle portion is equal to or larger than the inner diameter of the first atmosphere communication portion 50. With this configuration, in the case where the needle 24 is inserted into the first atmosphere communication portion 50 by a specified length, the middle portion of the needle 24 comes into close contact with the inner surface of the first atmosphere communication portion 50 as illustrated in FIG. 4C. Thus, the needle 24 and the first atmosphere communication portion 50 keep a liquid-tight fit between them.

The front wall 21*a* of the housing 21 has at its upper portions the liquid outlets 23 configured to be connected to the tubes 3 that communicate with the print head 2. The housing 21 has in its inside the second storage chambers 26 capable of storing the liquid supplied from the cartridges 12 and flow paths 27 that lead the liquid stored in the second storage chambers 26 to the liquid outlets 23.

With the above configuration, in the case where the sub-tank 22 is in a posture in normal use, the needle 24 is positioned lower than the second atmosphere communication portion 25 in the vertical direction. The introduction pipe 20 is positioned near the bottom portion of the sub-tank 22 and thus lower than the needle 24 in the vertical direction (the Z direction) in a posture in normal use. The needle 24 and introduction pipe 20 of the sub-tank 22 are formed at positions corresponding to the first atmosphere communication portion 50 and liquid supply port 42 of the cartridge 12.

Figure 5A:
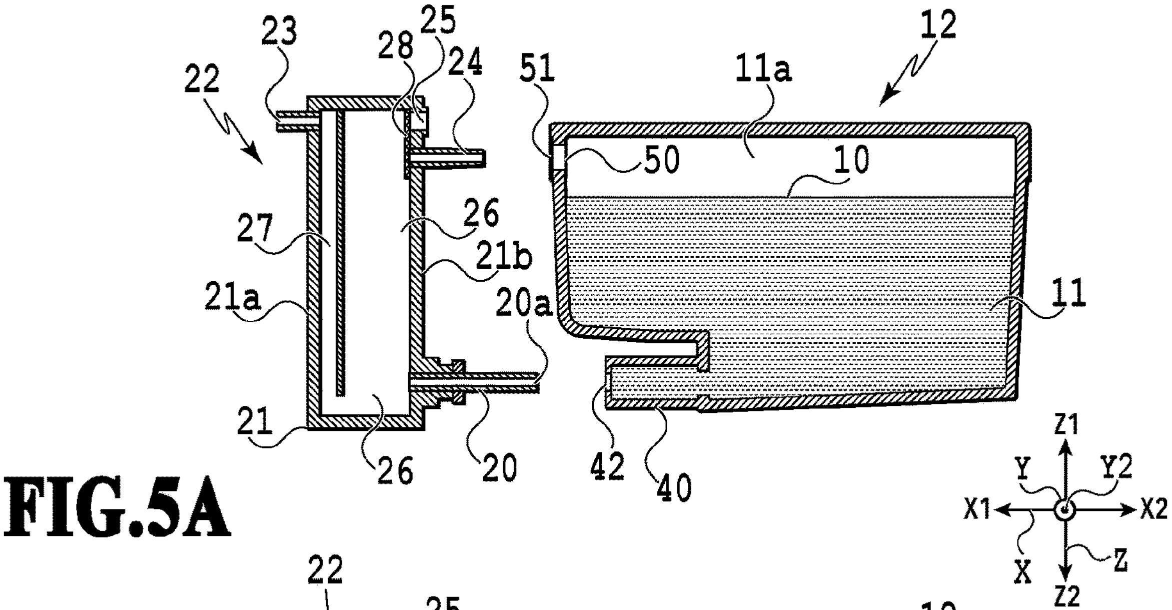
FIGS. 5A to 5C are cross-sectional schematic side views of the sub-tank illustrated in FIG. 2C and the cartridge illustrated in FIGS. 3A and 3B.
Figure 5B:
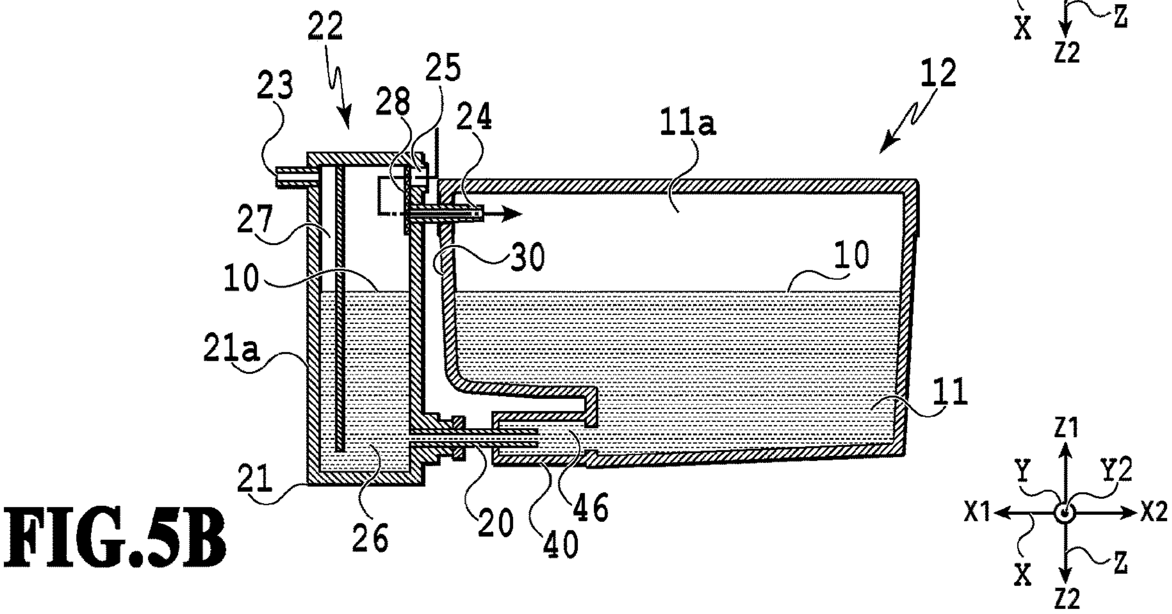
Figure 5C:
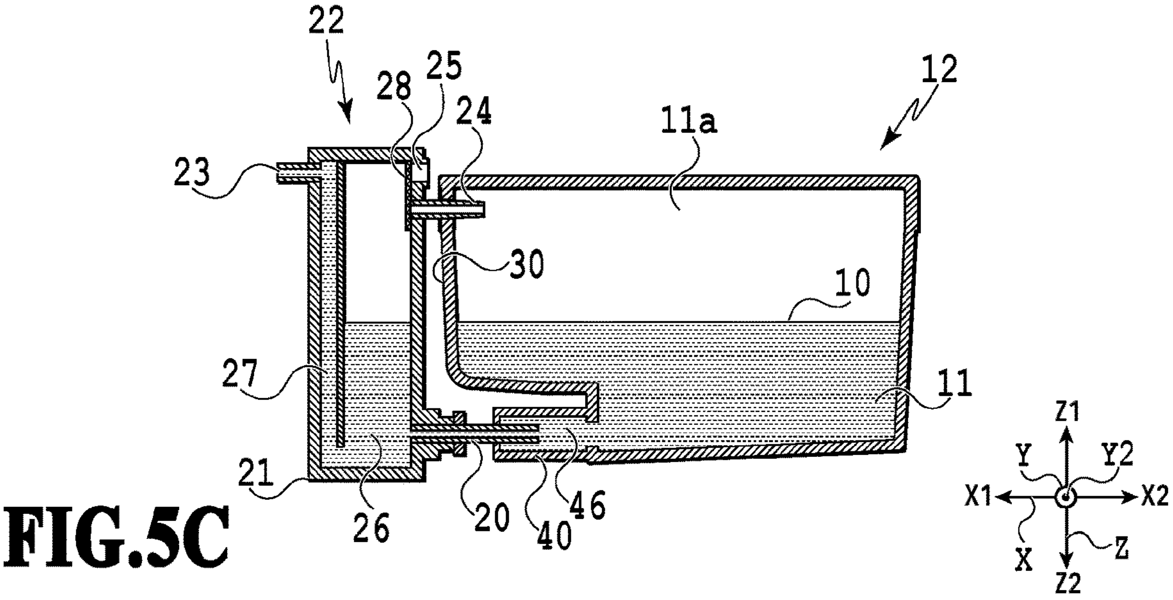

Next, description will be made of how the sub-tank 22 and cartridge 12 of the liquid supply apparatus 100 having the above configuration communicate with the atmosphere and how liquid moves between them, with reference to the cross-sectional schematic side views of FIGS. 5A to 5C. In FIGS. 5A to 5C, illustration of the first valve mechanism 47 provided in the liquid supply portion 40 of the cartridge 12 is omitted, but it is based on the assumption that actually the first valve mechanism 47 is provided as illustrated in FIGS. 1A and 1B and FIGS. 3A and 3B.

FIG. 5A illustrates the cartridge 12 before it is attached to the printing apparatus 1 in normal use. Specifically, FIG. 5A illustrates the cartridge 12 in its initial state before the cartridge 12 is attached (connected) to the sub-tank 22. In the initial state, the second storage chamber 26 of the sub-tank 22 contains no liquid, and the inside of the second storage chamber 26 is in communication with the atmosphere via the second atmosphere communication portion 25.

Conversely, the first storage chamber 11 of the cartridge 12 and the valve chamber 46 of the liquid supply portion 40 contain liquid. Since the liquid supply port 42 is closed by the first valve mechanism 47, the liquid will never leak from the liquid supply port 42. The first atmosphere communication portion 50 is also sealed with the film 51, and thus, the first storage chamber 11 of the cartridge 12 is not in communication with the atmosphere.

FIG. 5B illustrates the cartridge 12 attached to the printing apparatus 1. To attach the cartridge 12 to the printing apparatus 1, the front wall portion 30 of the cartridge 12 is directed to the sub-tank 22 and inserted into it. In the case where the cartridge 12 is attached to the printing apparatus 1, the needle 24 of the sub-tank 22 penetrates the film 51 closing the first atmosphere communication portion 50 of the cartridge 12 and protrudes into the air buffer chamber 11*a* of the cartridge 12. As a result, the cartridge 12 communicates with the atmosphere via the hollow needle 24, the second storage chamber 26 of the sub-tank 22, and the second atmosphere communication portion 25. This configuration forms an atmosphere introduction route from the sub-tank 22 to the cartridge 12 as indicated by an arrow in FIG. 5B.

At the same time, at lower portions of the sub-tank 22 and the cartridge 12, the introduction pipe 20 of the sub-tank 22 gets into the valve chamber 46 through the liquid supply port 42 of the liquid supply portion 40. Thus, as illustrated in FIG. 3B, the first storage chamber 11 of the cartridge 12 and the second storage chamber 26 of the sub-tank 22 become in liquid communication with each other via the introduction pipe 20. Here, since the cartridge 12 and the sub-tank 22 are in communication with the atmosphere as described earlier, the liquid stored in the first storage chamber 11 of the cartridge 12 starts moving (being supplied) to the second storage chamber 26 of the sub-tank 22 by the water head difference. This movement (supply) of the liquid continues until the liquid surface 10 of the first storage chamber 11 and the liquid surface 10 of the second storage chamber 26 become at the same level.

After that, the suction-based recovery mechanism provided in the printing apparatus 1 applies a negative pressure to the ejection ports of the print head 2 to perform a suction operation on the ejection ports. With this process, the liquid in the second storage chamber 26 of the sub-tank 22 is carried through the flow path 27 and the liquid outlet 23 to the tube 3 and eventually supplied to the print head 2. In this process, gas-liquid exchange to exchange liquid and gas occurs in the cartridge 12 and the sub-tank 22. Inflow and outflow of gas (air) in the gas-liquid exchange are made through the second atmosphere communication portion 25 provided in the sub-tank 22.

As has been described above, in the present embodiment, the needle 24 and the first atmosphere communication portion 50 are connected to each other in use, and thereby both the sub-tank 22 and the cartridge 12 can communicate with the atmosphere using only the second atmosphere communication portion 25 provided in the sub-tank 22. Thus, the cartridge 12 can communicate with the atmosphere with a simple configuration. In addition, liquid leakage from the atmosphere communication route during use can be prevented by the semipermeable membrane 28 provided on the sub-tank 22 side. Thus, the cartridge 12 does not need any longer to have a configuration for liquid leakage prevention. Thus, compared to the conventional structure in which both the sub-tank and the cartridge have configurations that enable communication with the atmosphere and liquid leakage prevention, the present embodiment makes it possible to reduce the part count of the cartridge 12. This in turn makes it possible to reduce the size and cost of the cartridge 12.

Second Embodiment

Next, a second embodiment of the present invention will be described with reference to FIGS. 6 to 8D. In FIGS. 6 to 8D, the portions the same as or corresponding to those described in the first embodiment are denoted by the same signs.

<Cartridge>

Figure 6:
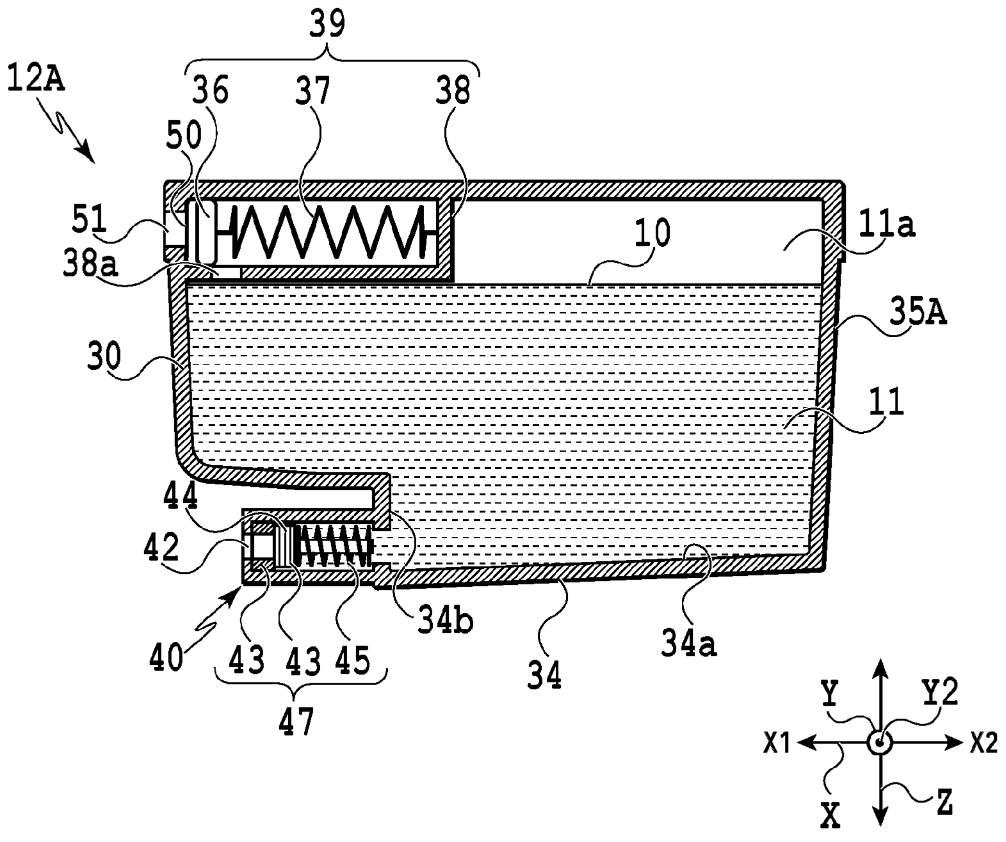
FIG. 6 is a cross-sectional schematic side view of a cartridge of a second embodiment.

FIG. 6 is a cross-sectional schematic side view of a cartridge 12A in the present embodiment. The cartridge 12A in the present embodiment has a housing 35A having an outer shape the same as or similar to the housing 35 of the cartridge 12 described in the first embodiment. Here, the housing 35A in the present embodiment has at its inside upper portion a second valve mechanism 39 that enables or shuts off the communication between the first atmosphere communication portion 50 and the air buffer chamber 11*a* of the first storage chamber 11.

The second valve mechanism 39 includes a valve 36 facing the first atmosphere communication portion 50, a coil spring 37 that urges the valve 36 toward the first atmosphere communication portion 50, and a support portion 38 that supports those parts. The bottom portion of support portion 38 has a communication hole 38*a*. In a state where an unused cartridge 12A is held in a posture in normal use, the second valve mechanism 39 is positioned higher than the liquid surface 10 of the liquid stored in the first storage chamber 11. Also, in the present embodiment, the cartridge 12A has a liquid supply portion 40 at its lower portion in a manner the same as or similar to the one in the first embodiment, and the liquid supply portion 40 has a first valve mechanism 47 inside. In the present embodiment, before a cartridge 12A is used, the first atmosphere communication portion 50 is sealed with the film 51 and the valve 36. These parts function as sealing members of the first atmosphere communication portion 50.

<Sub-Tank>

Figure 7A:
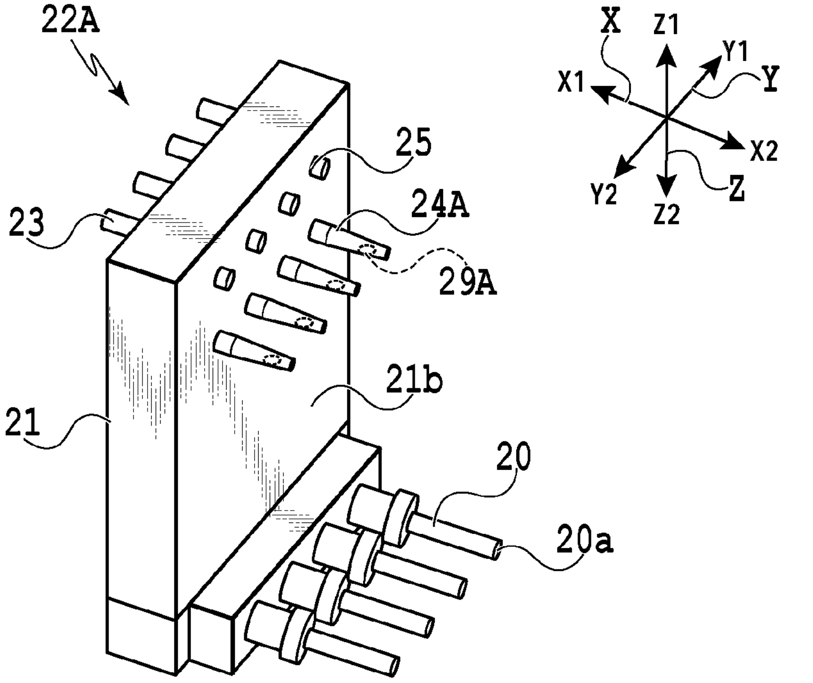
FIG. 7A is an external perspective view of a sub-tank of the second embodiment.
Figure 7B:
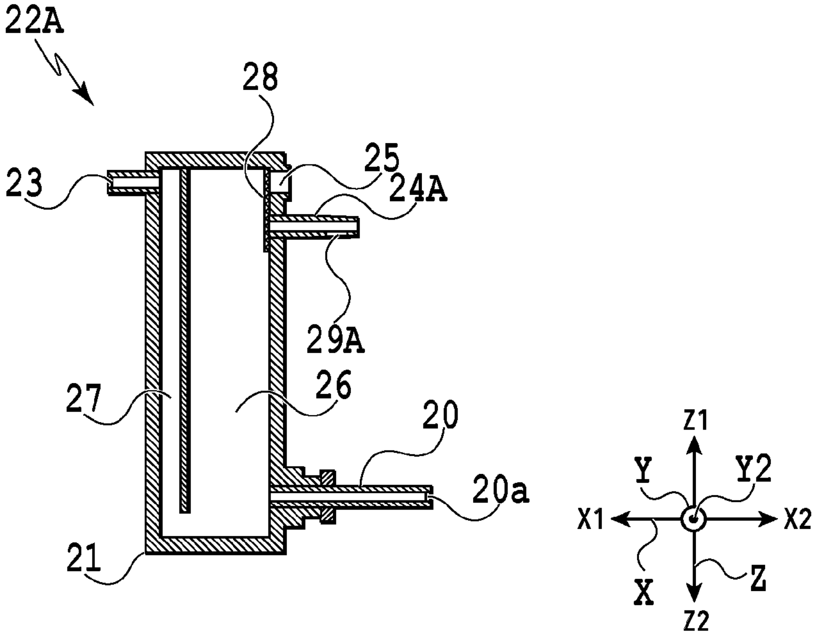
FIG. 7B is a cross-sectional schematic side view of the sub-tank of the second embodiment.

FIGS. 7A and 7B are diagrams illustrating a sub-tank 22A in the present embodiment. FIG. 7A is a perspective view, and FIG. 7B is a cross-sectional schematic side view. The sub-tank 22A in the present embodiment has hollow needles 24A provided on the rear wall. Each needle 24A has a closed rear end but has a needle hole 29A at a portion of the peripheral wall. This point is different from the first embodiment. The other configurations are the same as or similar to those in the first embodiment.

Next, description will be made of how the sub-tank 22A and cartridge 12A of the present embodiment communicate with the atmosphere and how liquid moves between them, with reference to cross-sectional schematic side views of FIGS. 8A to 8D. Also, in FIGS. 8A to 8D, illustration of the first valve mechanism 47 provided in the liquid supply portion 40 of the cartridge 12A is omitted.

Figure 8C:
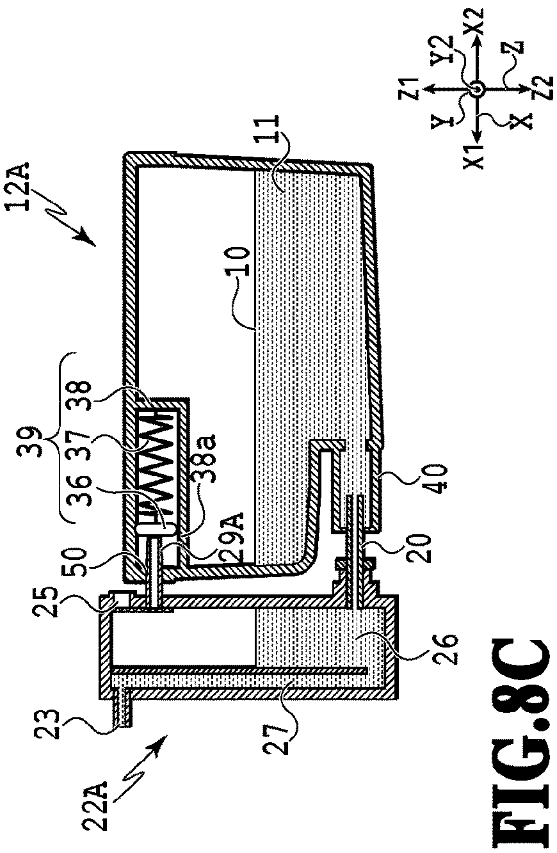
FIGS. 8A to 8D are cross-sectional schematic side views of the sub-tank in FIG. 6 and the cartridge in FIG. 7B.
Figure 8D:
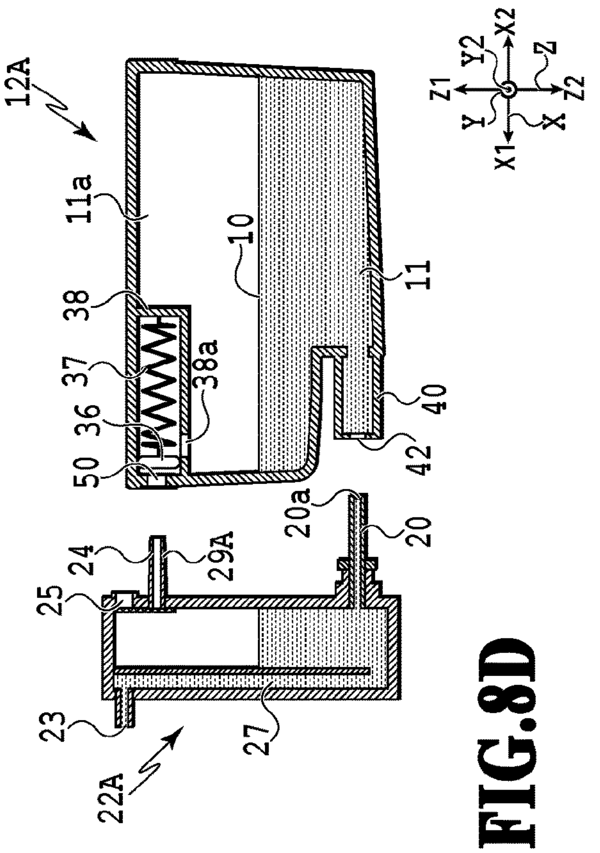
Figure 8A:
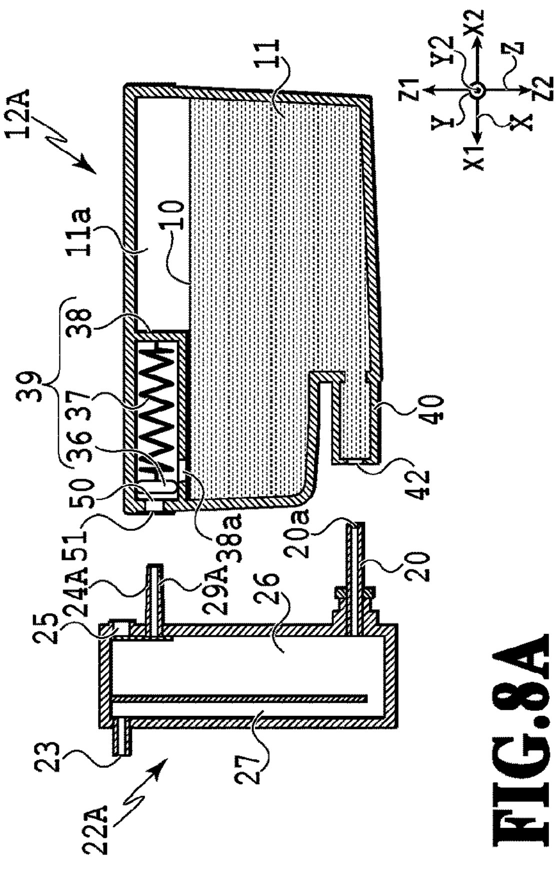

FIG. 8A illustrates the sub-tank 22A and the cartridge 12A before the cartridge 12A is attached to the printing apparatus 1. In this state, the second storage chamber 26 of the sub-tank 22A contains no liquid (ink) and is in communication with the atmosphere via the second atmosphere communication portion 25. Conversely, the first storage chamber 11 inside the cartridge 12A contains liquid. Since the first atmosphere communication portion 50 is sealed with the film 51 and the valve 36, the inside of the cartridge 12A is not in communication with the atmosphere. In the state illustrated in FIG. 8A, the coil spring 37 of the second valve mechanism 39 is expanded, and the valve 36 is held at a position closer to the first atmosphere communication portion 50 than the communication hole 38*a*. Thus, the communication between the first atmosphere communication portion 50 and the air buffer chamber 11*a* is shut off.

Figure 8B:
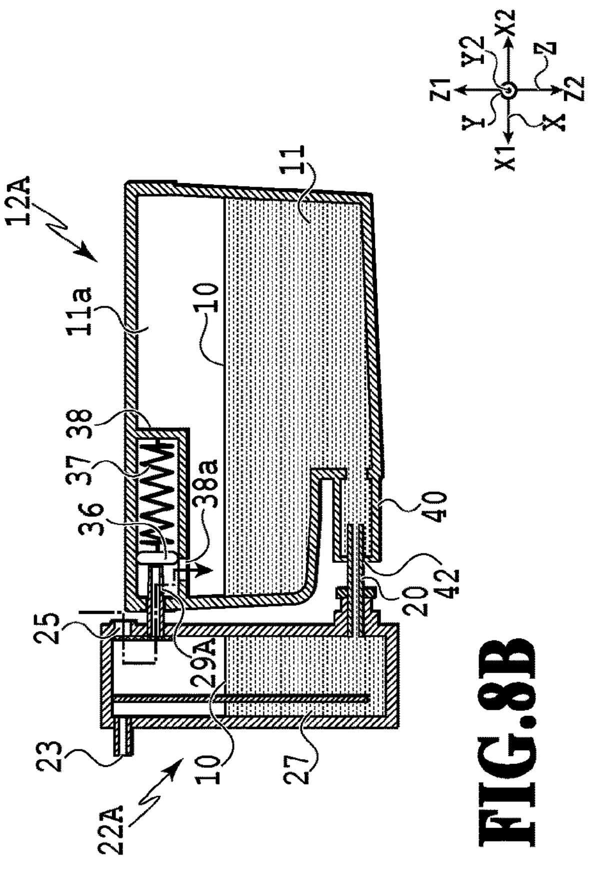

FIG. 8B illustrates the sub-tank 22A and the cartridge 12A connected to each other after the cartridge 12A is attached to the main body of the printing apparatus 1. In this state, the needle 24A of the sub-tank 22A penetrates the film 51 closing the first atmosphere communication portion 50 of the cartridge 12A. Then, the needle 24A pushes the valve 36 provided in the cartridge 12 and moves the valve 36 backward (in the X2 direction). The backward movement of the valve 36 makes the communication hole 38*a* provided at the bottom portion of the support portion 38 communicate with the needle hole 29A formed in the needle 24A. As a result, the air buffer chamber 11*a* of the cartridge 12A communicates with the atmosphere through the needle hole 29A of the sub-tank 22A, the second storage chamber 26, and the second atmosphere communication portion 25. An arrow in FIG. 8B indicates an atmosphere introduction route from the second atmosphere communication portion 25 of the sub-tank 22A to the air buffer chamber 11*a* of the cartridge 12A.

Since the first storage chamber 11 of the cartridge 12A is in communication with the atmosphere, the liquid in the first storage chamber 11 starts moving to the second storage chamber 26 by the water head difference. This movement of the liquid continues until the liquid surface 10 inside the first storage chamber 11 and the liquid surface 10 inside the second storage chamber 26 become at the same level. After that, as in the first embodiment, the suction-based recovery mechanism performs a suction operation on the print head 2 and supplies liquid in the second storage chamber 26 of the sub-tank 22A to the print head 2 via the flow path 27 and the tube 3. FIG. 8C illustrates the sub-tank 22A and the cartridge 12A after the liquid was supplied to the print head 2. After ink is loaded from the cartridge 12A into the print head 2, ink is supplied from the cartridge 12A to the print head 2 according to the consumption of ink in print operation.

FIG. 8D illustrates the cartridge 12A and the sub-tank 22A in a state where the cartridge 12A is removed from the sub-tank 22A before the liquid in the cartridge 12A is completely consumed. In the case where the cartridge 12A is removed from the sub-tank 22A, the valve 36 of the second valve mechanism 39 moves by the urging force of the coil spring 37 to the position where the valve 36 was before the cartridge 12 was attached to the sub-tank 22A, in other words, the position closer to the first atmosphere communication portion 50 than the communication hole 38*a*. As a result, the communication between the first atmosphere communication portion 50 and the air buffer chamber 11*a* is shut off. In the case where the introduction pipe 20 is pulled out of the liquid supply portion 40, the valve 44 of the first valve mechanism 47 comes into close contact with the seal member 43 and thereby closes the liquid supply port 42 (see FIG. 3A). With this operation, the cartridge 12 is put again into a state where the communication with the atmosphere is shut off.

As has been described above, also in the present embodiment, both the sub-tank 22A and the cartridge 12A can communicate with the atmosphere using only the second atmosphere communication portion 25 while preventing liquid leakage in use, as in the first embodiment. In addition, even in the case where the cartridge 12A is removed from the sub-tank 22A, it is possible to prevent liquid leakage from the first atmosphere communication portion 50, improving the convenience of the cartridge 12A.

Third Embodiment

Figure 9A:
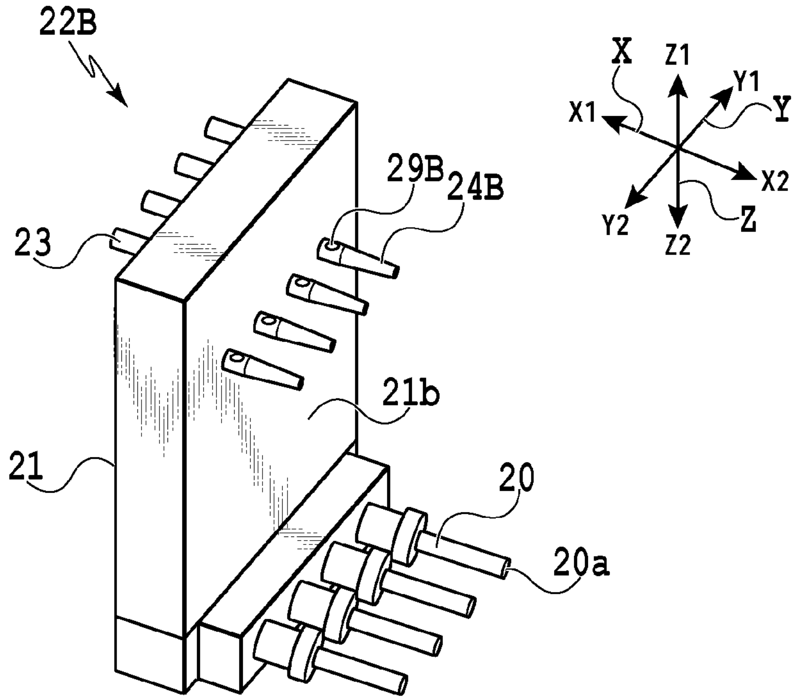
FIG. 9A is an external perspective view of a sub-tank of a third embodiment.
Figure 9B:
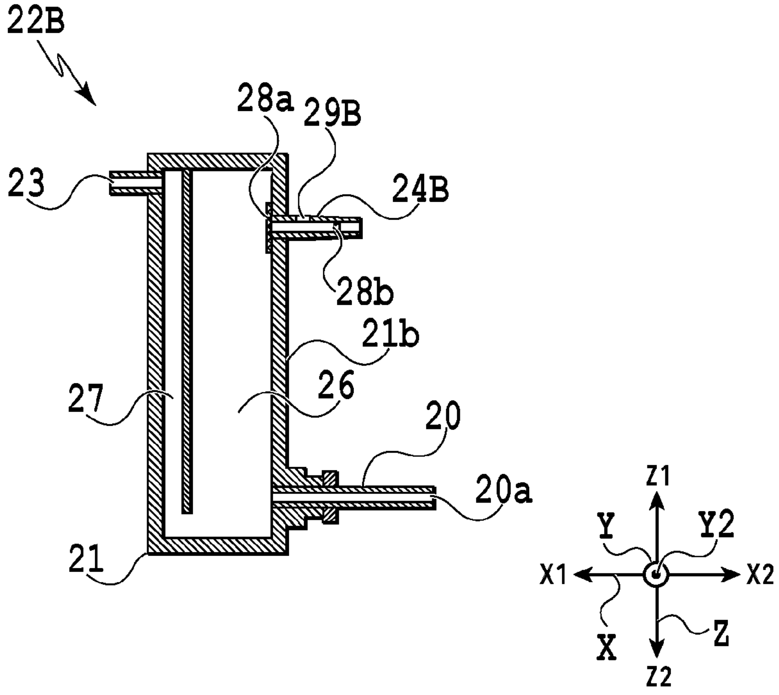
FIG. 9B is a cross-sectional schematic side view of the sub-tank of the third embodiment.
Figure 10:
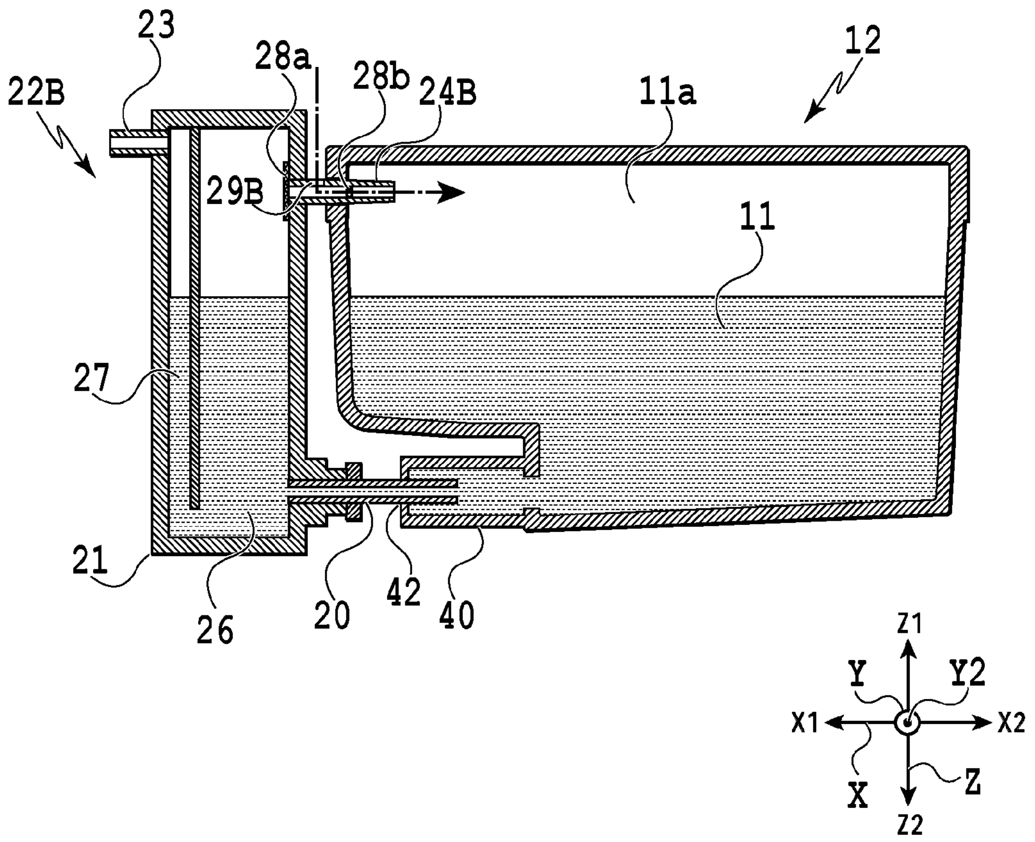
FIG. 10 is a cross-sectional schematic side view of the cartridge illustrated in FIG. 2C attached to the sub-tank illustrated in FIG. 9B.

Next, a third embodiment of the present invention will be described with reference to FIGS. 9A to 10. FIGS. 9A and 9B are diagrams illustrating a sub-tank 22B in the present embodiment. FIG. 9A is a perspective view, and FIG. 9B is a cross-sectional schematic side view. The sub-tank 22B in the present embodiment has needles 24B provided on a rear wall portion 21*b* of a housing 21, and each needle 24B has a needle hole 29B near its basal portion. This needle hole 29B, as described below, performs a function the same as or similar to that of the second atmosphere communication portion 25 in the first and second embodiments. Hence, the rear wall portion 21*b* of the housing 21 in the present embodiment does not have the second atmosphere communication portions 25 described in the first and second embodiments. The needle 24B has openings at both the front and rear ends. In addition, the needle 24B is provided with semipermeable membranes 28*a* and 28*b* at a front portion and a rear portion on both sides of the needle hole 29B. Specifically, the semipermeable membrane 28*a* is disposed at the position that covers the opening of the front end of the needle 24B, and the semipermeable membrane 28*b* is disposed at a position in the inner space between the opening at the rear end of the needle 24B and the needle hole 29B. This configuration makes it possible to prevent both ink leakage from the sub-tank 22B side and ink leakage from the cartridge 12 side. The other configurations are the same as or similar to those in the sub-tank 22 described in in the first embodiment.

In the present embodiment, the cartridge 12 described in the first embodiment is applied to the sub-tank 22B. In the case where the cartridge 12 is attached to the main body of the printing apparatus 1, the cartridge 12 and the sub-tank 22B are connected as illustrated in FIG. 10. Specifically, the needle 24B of the sub-tank 22B passes through the first atmosphere communication portion 50 of the cartridge 12 and gets into the air buffer chamber 11*a*, and the introduction pipe 20 of the sub-tank 22B passes through the liquid supply port 42 of the cartridge 12 and gets into the liquid supply portion 40.

In the state where the sub-tank 22B and the cartridge 12 are connected, the needle hole 29B formed in the needle 24B is positioned between the sub-tank 22B and the cartridge 12 and is open to the atmosphere. Thus, both the second storage chamber 26 of the sub-tank 22B and the first storage chamber 11 of the cartridge 12 are in communication with the atmosphere via the needle 24B and the needle hole 29B. Hence, also the present embodiment provides the effects the same as or similar to the ones in the first or the second embodiment. In addition, the present embodiment does not require the second atmosphere communication portion that the first and second embodiments has, making it possible to simplify the outer wall structure of the sub-tank 22B.

Fourth Embodiment

Next, a fourth embodiment of the present invention will be described with reference to FIGS. 11A to 12B. The present embodiment includes a sub-tank 22C which is applicable to both the cartridge 12 described in the first embodiment and the cartridge 12A described in the second embodiment.

Figure 11A:
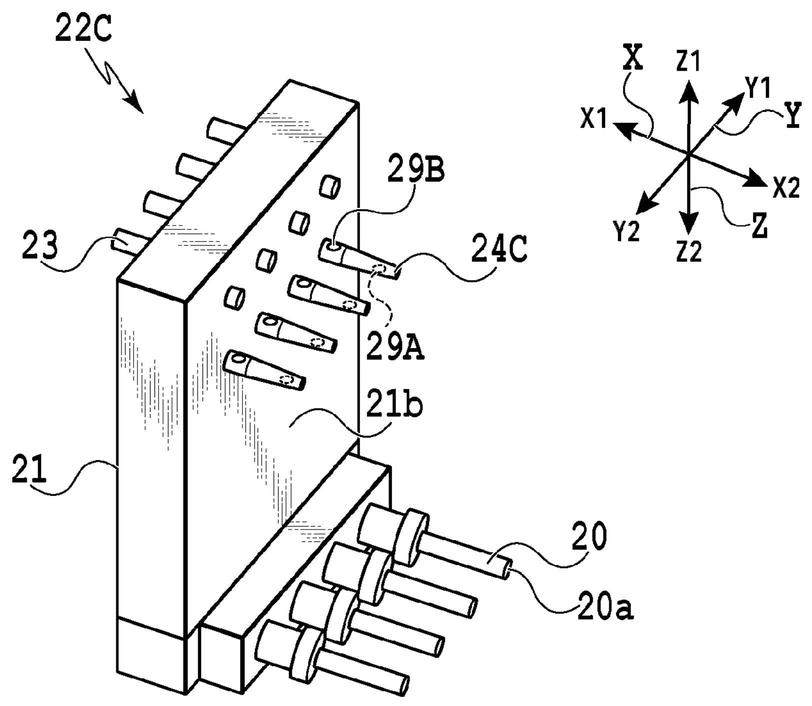
FIG. 11A is an external perspective view of a sub-tank of a fourth embodiment.
Figure 11B:
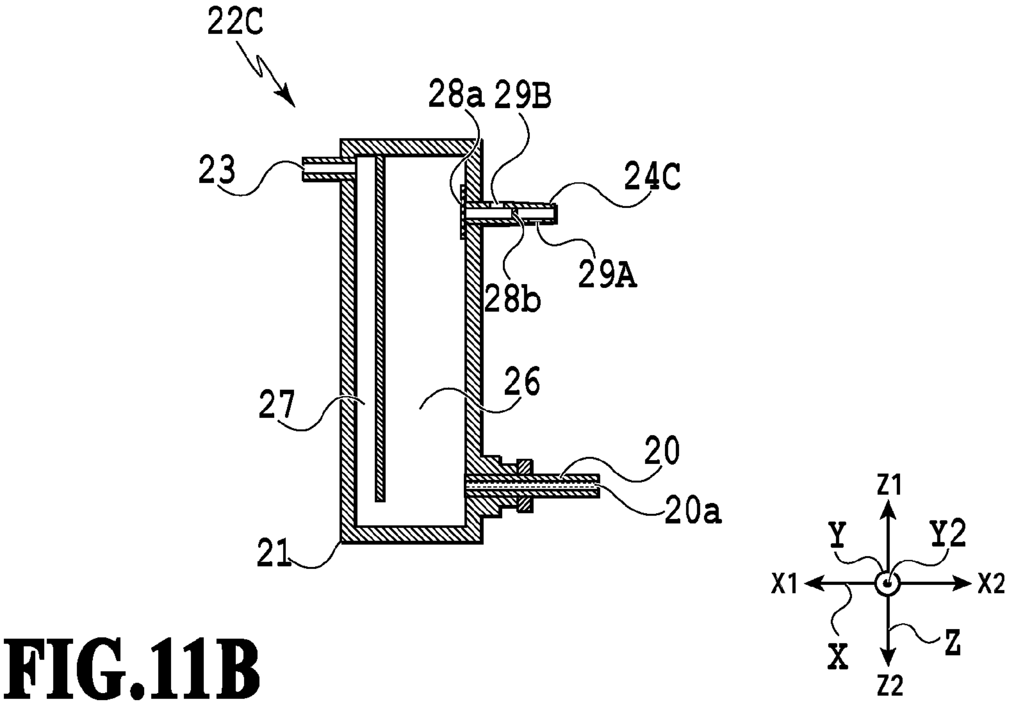
FIG. 11B is a cross-sectional schematic side view of the sub-tank of the fourth embodiment.

FIGS. 11A and 11B are diagrams illustrating the sub-tank 22C in the present embodiment. FIG. 11A is a perspective view, and FIG. 11B is a cross-sectional schematic side view. The sub-tank 22C has needles 24C provided on the rear wall portion 21*b* of the housing 21 and having an outer shape approximately the same as the ones in the above embodiments. Each needle 24C has openings at both front and rear ends and has needle holes 29A and 29B at a front portion and a rear portion of the peripheral wall. The needle hole 29A is the same as or similar to the one described in the second embodiment, and the needle hole 29B is the same as or similar to the one described in the third embodiment. The needle 24C has a semipermeable membrane 28*b* in the inner space between the needle hole 29A and the needle hole 29B, and also has a semipermeable membrane 28*a* at the position that covers the opening on the front end side of the needle 24C. These semipermeable membranes 28*a* and 28*b* make it possible to prevent both liquid leakage from the sub-tank 22C side and ink leakage from the cartridge 12 side. The other configurations of the sub-tank 22C are the same as or similar to the ones in the third embodiment. Hence, also in the present embodiment, the rear wall portion of the housing 21 of the sub-tank 22C does not have the second atmosphere communication portions 25 described in the first and second embodiments.

Figure 12A:
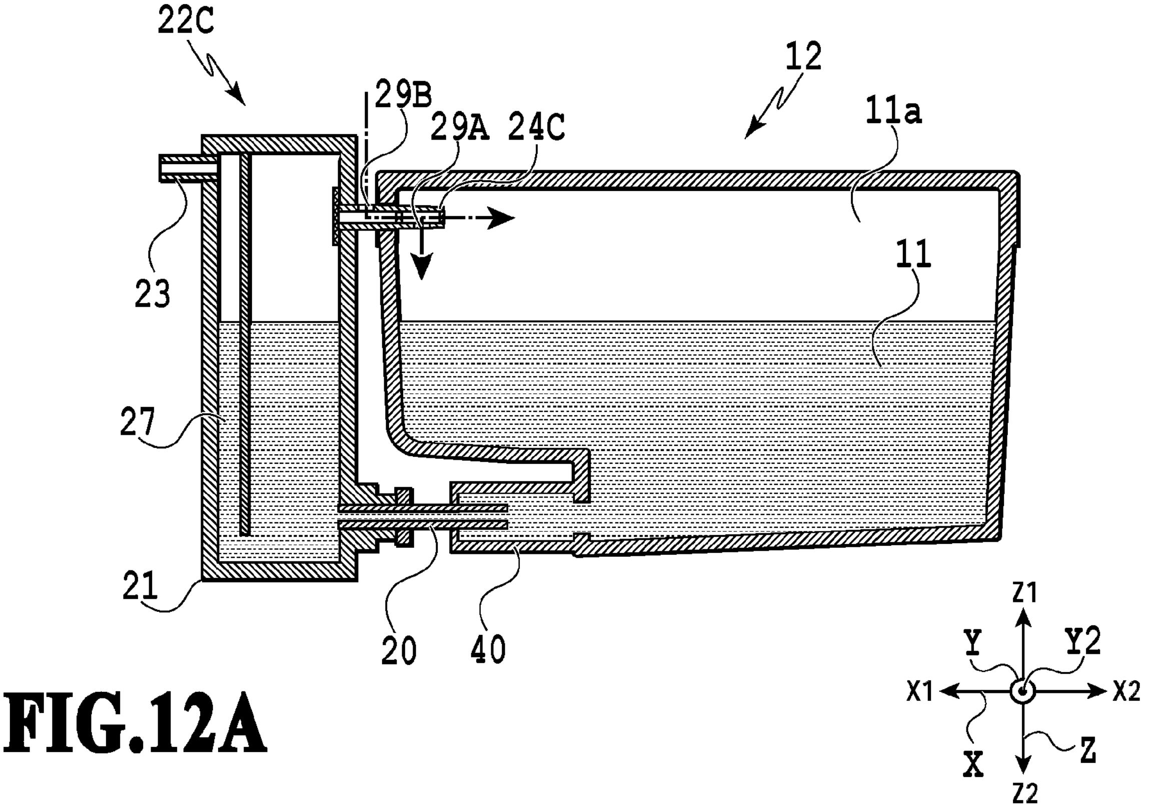
FIG. 12A is a cross-sectional schematic side view of the cartridge illustrated in FIGS. 2A to 2C attached to the sub-tank illustrated in FIG. 11B.
Figure 12B:
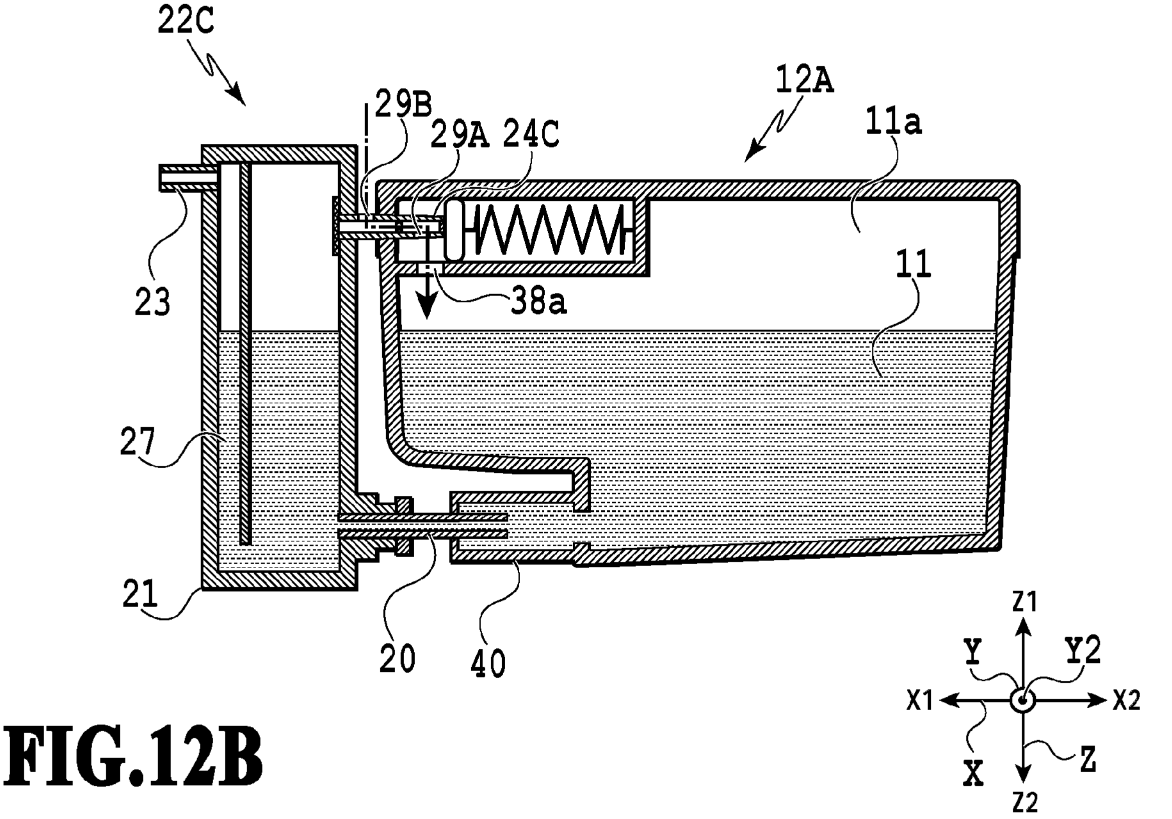
FIG. 12B is a cross-sectional schematic side view of the cartridge illustrated in FIG. 6 attached to the sub-tank illustrated in FIG. 11B.

FIGS. 12A and 12B are diagrams illustrating the sub-tank 22C in the present embodiment to which the two different cartridges are applied. Here, the cartridge 12 illustrated in FIG. 12A is the same as the cartridge 12 (see FIG. 2) described in the first embodiment, and the cartridge 12A illustrated in FIG. 12B is the same as the cartridge 12A (see FIG. 6) described in the second embodiment.

As illustrated in FIG. 12A, in the case where the cartridge 12 is connected to the sub-tank 22C, both the second storage chamber 26 of the sub-tank 22C and the first storage chamber 11 of the cartridge 12 can communicate with the atmosphere through the needle 24 and the needle holes 29A and 29B.

As illustrated in FIG. 12B, in the case where the cartridge 12A is connected to the sub-tank 22C, the second storage chamber 26 is in communication with the atmosphere through the needle 24C and the needle hole 29B. The air buffer chamber 11 a of the first storage chamber 11 is in communication with the atmosphere through the communication hole 38*a*, the needle hole 29A, the needle 24C, and the needle hole 29B.

The present embodiment as described above makes it possible to provide the effects the same as or similar to the ones in the above embodiments and at the same time be adapted to the two types of cartridges 12 and 12A. Thus, the present embodiment improves the compatibility of the cartridges.

As has been described above, above each embodiment enables both the cartridge and the sub-tank to be in communication with the atmosphere through only the sub-tank. In addition, in use, it is possible to prevent liquid leakage from the cartridge by using a function on the sub-tank side. This configuration makes it possible to reduce the part count and the size of the cartridge and thereby to provide the cartridge at low cost.

Other Embodiments

The present invention is not limited to the aspects of the sub-tanks and cartridges described in the above examples. For example, although the sub-tanks in the above embodiments are based on examples in which a plurality of cartridges are attached to a single sub-tank, a plurality of separate sub-tanks may be provided, and cartridges may be attached to respective sub-tanks.

In the sub-tank, the positions, the numbers, the shapes, and other features of the second atmosphere communication portions, the first connecting portions, the second connecting portions, and the liquid outlets may be changed as appropriate. Similarly, in the cartridge, the positions and shapes of the first atmosphere communication portion and the liquid supply port, the numbers of those portions, and other features may be changed as appropriate.

In addition, to increase the liquid tightness of the connecting portion between the needle and the first atmosphere communication portion in use, a seal member may be interposed between the first atmosphere communication portion of the cartridge and the needle of the sub-tank. In this case, the seal member may be provided on the inner surface or at a peripheral edge portion of the first atmosphere communication portion or may be provided on the peripheral surface of the needle.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-052597, filed Mar. 24, 2020, which is hereby incorporated by reference wherein in its entirety.

What is claimed is:

1. A liquid supply apparatus comprising:

a liquid ejecting head configured to scan and eject liquid in the apparatus;

a liquid storage tank fixedly held in the apparatus and in communication with the liquid ejecting head via a tube; and a cartridge that stores liquid and is detachably attached in a housing of the apparatus to the liquid storage tank, the cartridge being attached to the liquid storage tank in a state where the liquid ejecting head is ejecting liquid, wherein the liquid storage tank includes an atmosphere communication portion in communication with the atmosphere, a first connecting portion that, in a state where the cartridge is attached to the liquid storage tank, enables the cartridge to be in liquid communication with the liquid storage tank, and a second connecting portion that, in the state where the cartridge is attached to the liquid storage tank, is connected to the cartridge so as to be liquid-tight with the cartridge and to be positioned higher than a liquid surface of liquid stored inside the cartridge, and enables the cartridge to be in gaseous communication with the atmosphere communication portion, wherein the cartridge is detachably attached to the liquid storage tank in a horizontal direction of the housing of the apparatus.

2. The liquid supply apparatus according to claim 1, wherein the atmosphere communication portion is positioned higher than a liquid surface of liquid stored inside the liquid storage tank in the state where the cartridge is attached to the liquid storage tank.

3. The liquid supply apparatus according to claim 1, wherein the atmosphere communication portion is formed in a wall portion of the liquid storage tank, and the atmosphere communication portion is covered with a gas-liquid separation member that blocks liquid from passing through but allows gas to pass through.

4. The liquid supply apparatus according to claim 1, wherein the second connecting portion and the atmosphere communication portion are covered with a gas-liquid separation member that blocks liquid from passing through but allows gas to pass through.

5. The liquid supply apparatus according to claim 1, wherein the second connecting portion is provided adjacent to the atmosphere communication portion.

6. The liquid supply apparatus according to claim 1, wherein in the state where the cartridge is attached to the liquid storage tank, the second connecting portion is positioned above the liquid storage tank.

7. A liquid supply apparatus comprising:

a liquid ejecting head configured to scan and eject liquid in the apparatus;

a liquid storage tank fixedly held in the apparatus and in communication with the liquid ejecting head via a tube; and a cartridge that stores liquid and is detachably attached in a housing of the apparatus to the liquid storage tank, the cartridge being attached to the liquid storage tank in a state where the liquid ejecting head is ejecting liquid, wherein the liquid storage tank includes an atmosphere communication portion in communication with the atmosphere, a first connecting portion that, in a state where the cartridge is attached to the liquid storage tank, enables the cartridge to be in liquid communication with the liquid storage tank, and a second connecting portion that, in the state where the cartridge is attached to the liquid storage tank, is connected to the cartridge so as to be liquid-tight with the cartridge and to be positioned above the liquid storage tank, and enables the cartridge to be in gaseous communication with the atmosphere communication portion, wherein the cartridge is detachably attached to the liquid storage tank in a horizontal direction of the housing of the apparatus.

8. The liquid supply apparatus according to claim 7, wherein the atmosphere communication portion is positioned higher than a liquid surface of liquid stored inside the liquid storage tank in the state where the cartridge is attached to the liquid storage tank.

9. The liquid supply apparatus according to claim 7, wherein the atmosphere communication portion is formed in a wall portion of the liquid storage tank, and the atmosphere communication portion is covered with a gas-liquid separation member that blocks liquid from passing through but allows gas to pass through.

10. The liquid supply apparatus according to claim 7, wherein the second connecting portion and the atmosphere communication portion are covered with a gas-liquid separation member that blocks liquid from passing through but allows gas to pass through.

11. The liquid supply apparatus according to claim 7, wherein in the state where the cartridge is attached to the liquid storage tank, the second connecting portion is positioned higher than a liquid surface of liquid stored inside the cartridge.

12. A liquid supply apparatus comprising:

a liquid ejecting head configured to scan and eject liquid in the apparatus;

a liquid storage tank fixedly held in the apparatus and in communication with the liquid ejecting head via a tube; and a cartridge that stores liquid and is detachably attached in a housing of the apparatus to the liquid storage tank, the cartridge being attached to the liquid storage tank in a state where the liquid ejecting head is ejecting liquid, wherein the liquid storage tank includes an atmosphere communication portion in communication with the atmosphere, a first connecting portion that, in a state where the cartridge is attached to the liquid storage tank, enables the cartridge to be in liquid communication with the liquid storage tank, and a second connecting portion that, in the state where the cartridge is attached to the liquid storage tank, is connected to the cartridge so as to be liquid-tight with the cartridge and enables the cartridge to be in gaseous communication with the atmosphere communication portion, wherein the second connecting portion is provided adjacent to the atmosphere communication portion, wherein the cartridge is detachably attached to the liquid storage tank in a horizontal direction of the housing of the apparatus.

13. The liquid supply apparatus according to claim 12, wherein the atmosphere communication portion is positioned higher than a liquid surface of liquid stored inside the liquid storage tank in the state where the cartridge is attached to the liquid storage tank.

14. The liquid supply apparatus according to claim 12, wherein the atmosphere communication portion is formed in a wall portion of the liquid storage tank, and the atmosphere communication portion is covered with a gas-liquid separation member that blocks liquid from passing through but allows gas to pass through.

15. The liquid supply apparatus according to claim 12, wherein the second connecting portion and the atmosphere communication portion are covered with a gas-liquid separation member that blocks liquid from passing through but allows gas to pass through.

16. The liquid supply apparatus according to claim 12, wherein in the state where the cartridge is attached to the liquid storage tank, the second connecting portion is positioned higher than a liquid surface of liquid stored inside the cartridge.

* * * * *